United States Patent [19]

van de Kraats et al.

[11] 3,984,333

[45] Oct. 5, 1976

[54] OIL-DISPLACING AQUEOUS SOLUTION THICKENED WITH RESERVOIR-TAILORED BLOCK COPOLYMER

[75] Inventors: Eduard J. van de Kraats; Webster M. Sawyer, Jr., both of Houston, Tex.

[73] Assignee: Shell Oil Company, Houston, Tex.

[22] Filed: Apr. 7, 1975

[21] Appl. No.: 566,006

[52] U.S. Cl. .............................. 252/8.55 D; 166/275; 260/823; 260/880 B; 260/881; 260/885
[51] Int. Cl.² ........................................ E21B 43/20
[58] Field of Search ............... 252/8.55 D; 166/275; 260/880 B

[56] References Cited
UNITED STATES PATENTS

| | | | |
|---|---|---|---|
| 3,085,063 | 4/1963 | Turbak | 252/8.55 |
| 3,101,374 | 8/1963 | Patton | 252/89 X |
| 3,116,791 | 1/1964 | Sandiford et al. | 166/274 |
| 3,203,955 | 8/1965 | Jackson et al. | 252/542 X |
| 3,577,357 | 5/1971 | Winkler | 260/2.2 |
| 3,634,305 | 1/1972 | Johnson | 166/275 X |
| 3,639,574 | 2/1972 | Schmolka | 252/313 X |
| 3,747,676 | 7/1973 | Norton et al. | 252/8.55 X |
| 3,776,310 | 12/1973 | Norton et al. | 252/8.55 X |

Primary Examiner—Herbert B. Guynn

[57] ABSTRACT

An oil recovery process in which an aqueous solution is injected into a subterranean reservoir to displace oil through the reservoir is improved by thickening the solution with a substantially linear block copolymer containing both water-soluble and water-insoluble polymer chains. The composition and concentration of the copolymer are correlated with the temperature and injectivity of the reservoir to provide a thickened solution of selected mobility and stability within the reservoir.

2 Claims, No Drawings

OIL-DISPLACING AQUEOUS SOLUTION THICKENED WITH RESERVOIR-TAILORED BLOCK COPOLYMER

BACKGROUND OF THE INVENTION

The invention relates to injecting an aqueous solution into a subterranean reservoir to displace fluid within the reservoir. It is useful in substantially any well-treating or oil-recovery process in which reservoir fluid is displaced, particularly in a relatively tight and hot reservoir.

Known oil-displacing processes use aqueous solutions thickened with water-soluble polymers. Such a process was described in the K. D. Ketling Pat. No. 2,341,500 applied for in 1942. Block copolymers containing polymer chains or blocks of varying water-solubility are used in aqueous solutions for various purposes. For example, surfactants comprising block copolymers of polyoxypropylene and polyoxyethylene blocks are described in U.S. Pat. No. 3,203,955. Strong and relatively flexible solid ion exchange resins, of sulfonated polyvinyl arene and alpha-olefin elastomeric blocks, are described in the D. L. E. Winkler U.S. Pat. No. 3,577,357. Block copolymers containing polystyrene and polyisoprene polymer chains and the products of partially hydrogenating such polymers, to reduce most or all of the diene double bonds and provide particularly elastomeric and chemically stable rubber-like materials, are described in the M. M. Wald and M. G. Quam U.S. Pat. No. 3,595,942.

In an oil recovery process in which a polymer-thickened aqueous solution is injected into a subterranean reservoir, the polymeric water thickener is often subjected to shear-degradation. The solution is forced to flow through well conduits and into the relatively fine pores of the reservoir. The reservoir often has a permeability of less than 1 darcy. When fluids are injected at commercially feasible rates, the shearing effects are often significant. Further, in such reservoirs the thickener is usually subjected to hydrolyzing conditions. For example, the thickener may be heated at from about 120° to 180°F under pressures of at least several hundred pounds per square inch for times of from about 4 to 10 years. The water in such reservoirs often contain salts that tend to precipitate a polymeric water thickener or decrease its viscosity-enhancing ability.

Because of the severe physical and chemical requirements, plus a need for a relatively low cost, only a few polymeric water thickeners have been tested in oil recovery processes. Those are polyacrylates, such as partially hydrolyzed polyacrlamides, and polysaccharides such as the xanthan polymers. The polyacrylates have relatively low shear and chemical stabilities and the polysaccharides contain pore-plugging particles that are difficult to remove. In SPE Paper No. 4748, by Hill, Brew, Claridge, Hite and Pope, presented at the April 1974 Symposium on Oil Recovery, it is indicated that the polyacrylamides are subject to mechanical degradation and may be severely degraded when injected through restricted entry completions at some field rates. Mobility control mechanisms are complex and require careful evaluation for each particular application. As shown by Jennings et al. (*Journal Petroleum Technology*, March 1971, 391–401), use of polyacrylamide polymers in high permeability rocks may require large concentrations of polymer to achieve adequate mobility control. This situation is particularly aggravated when high permeability rocks and a highly saline aqueous phase are both a part of the total environment of the application. Finally, stability of polyacrylamide solutions for long reservoir times at high temperatures (above 140°F) has not been adequately established and/or documented.

Biopolymers offer some potential advantages (1) the mobility control mechanism appears to be that of viscosity building alone; thus, design and monitoring are simplified; (2) the viscosity, as shown by Jennings (above), is not as sensitive to high salt concentrations; and (3) the solutions are not as sensitive to mechanical degradation as polyacrylamide solutions. But, offsetting these potential advantages of the biopolymers, are questions regarding filterability-injectivity, gel formation in aqueous environments containing multivalent cations and long-term stability or resistance to chemical alteration in the reservoir environment.

SUMMARY OF THE INVENTION

The present invention relates to displacing fluid within a subterranean reservoir by injecting a thickened aqueous solution into the reservoir. The solution is thickened by dissolving a substantially water-soluble, substantially linear, block copolymer in an aqueous liquid in a proportion such that the solution has a selected viscosity at the reservoir temperature. The block copolymer contains relatively water-soluble and relatively water-insoluble polymer blocks. The compositions and proportions of the polymer blocks are correlated with the temperature and injectivity of the reservoir so that the thickened solution of the block copolymer has a selected degree of shear and chemical stability within the reservoir. The thickened solution is injected into the reservoir at a rate less than one at which the viscosity of the polymer is significantly reduced by a shear-degradation of the copolymer molecules.

DESCRIPTION OF THE INVENTION

The invention is, at least in part, premised on the following discovery. An aqueous solution can be efficiently thickened by dissolving in the solution a substantially linear block copolymer consisting of polymer blocks or chains having at least two chemically different compositions such that some of the blocks are relatively water-soluble while others are relatively water-insoluble. In an aqueous solution of such a copolymer the presence of the relatively water-insoluble blocks within the copolymer tends to cause the formation of clusters of the polymer molecules. The water-soluble portions become grouped together so that the dissolved polymers behave as though they have a relatively high molecular weight and thickening power. But, when an aqueous solution of such a copolymer is subjected to a high rate of shear the clusters disassociate for as long as the shear rate remains high. As soon as the shear rate is lowered, the clusters reform and the solution viscosity increases to that attained when the polymer clusters act as dissolved macromolecules.

This unique behavior is particularly advantageous in a process in which a relatively large volume of thickened solution is injected into a subterranean reservoir. At a desirably high rate of injection, the solution is subjected to a relatively high rate of shear as it enters the pores of the reservoir. In the present process, the shearing causes the clusters of the dissolved block copolymer to be disassociated. The solution is shear-thinning and is easily injected at a relatively high rate. But, since it is only the clusters which are disassociated, the thinning is temporary. As the solution flows away from the point of injection, the rate of flow diminishes with the square of the distance. When the flow rate decreases, the copolymer clusters reform and the effective viscosity of the solution is regained.

Heretofore, a delayed viscosity increase during an injection of a thickened solution required a relatively difficult control of the composition and pH of the injected solution. U.S. Pat. No. 3,208,518 describes a process in which the pH of an aqueous solution being injected is kept low. At the low pH the viscosity of the solution is less than it will become when the pH-reducing chemicals have been neutralized by the reservoir rock.

In contrast, the present process avoids the need for maintaining such a chemical control throughout the several months or more required for injecting an oil displacing solution into a reservoir. The present process needs only a relatively nominal chemical monitoring and controling typical of any reservoir-treating process.

Various procedures for modifying or designing water-thickening polymers to increase their shear stability often fail or have the opposite effect. For example, cross-linking can be induced between the molecules of various polymers. It might seem that by thus forming more than one bond to be cleaved before the molecular weight of the polymer is decreased, the thickening ability would be resistant to shear thinning. However, the intramolecular cross-linking tends to be more effective in reducing the polymer coil size (total effective size of the molecule), which reduces the thickening power. Similarly, it might seem desirable to use branched-chain or graft polymers. Such polymers contain a generally linear polymer chain backbone onto which branches have been grafted, to form a non-linear polymer. It might be expected that if shearing removed one branch, the polymer thickening power would not be significantly reduced. However, the dominant effect tends to be the coil-size reduction which, like the intromolecular cross-linking, tends to decrease the amount of solution thickening per weight of dissolved polymer.

In the present process, both the compositions and the relative proportions of the polymer chain blocks (or components) of the block copolymers are important. In a good solvent a polymer has a better thickening power, due to its tendency to have an effective coil size which is larger than its effective coil size in a bad solvent. In the present process, the block copolymers are preferably both linear and composed of both water-soluble blocks having molecular weights in the range of from about 100,000 to 2,000,000, and water-insoluble blocks having molecular weights in the range of from about 1,000 to 10,000. Referring to the water-soluble blocks as A and the water-insoluble blocks as B, each copolymer molecule can be composed of the A and B blocks in a wide variety of sequences and proportions. A particularly suitable arrangement is one B-A-B sequence per molecule, where the size and compositions of the water-soluble polymer chains (block A) impart significant water-solubility to the copolymer molecule. Particularly suitable block copolymers comprise blocks of sulfonated polystyrene mixed with blocks of hydrogenated-polyisoprene or hydrogenated-polybutadiene. Additional examples of polymer blocks suitable for use in the preferred B-A-B block copolymers of the present invention are contained in Table I.

TABLE I

| SUITABLE B-A-B BLOCK COPOLYMERS | |
|---|---|
| Water Soluble Block, A | Water Insoluble Block, B |
| Sulfonated poly-(vinylarene) such as styrene, α-methyl styrene and mixtures thereof | Hydrogenated poly-(conjugated diene) such as isoprene, butadiene and mixtures thereof |
| Poly-(epoxides) such as ethylene oxide, glycidol, sulfonated vinylarene oxide and mixtures thereof | Poly-(epoxides) such as alkene oxides other than ethylene oxide, vinylarene oxides and mixtures thereof |
| Poly-(acrylates) or -(methacrylates) containing carboxylic or sulfonic acid groups such as acrylic or methacrylic acid or 2-acrylamido-2-methyl propyl sulfonate | Poly-(acrylonitril) poly-(alkyl acrylates) or -(methacrylates) poly-(arylacrylates) or -(methacrylates) |

The preferred block copolymers are preferably formed by treating a copolymer of monovinylarene and conjugated diene polymer blocks to sulfonate the blocks of monovinylarenes, such as styrene, alpha-methylstrene, and mixtures thereof, and hydrogenate the blocks of conjugated dienes, such as butadiene or isoprene, or mixtures thereof. The hydrogenation of the diene polymer blocks converts them to essentially the equivalent of alpha-olefin polymer blocks and thus imparts a significant increase in chemical stability. For example, the hydrogenation of an isoprene polymer block converts it to substantially an ethylene propylene rubber block. Typical polymers which may be utilized as starting materials for making the preferred block copolymers of the present invention comprise poly-isoprene-polystyrene-poly-isoprene-block copolymers, or poly-isoprene-polyalpha-methyl styrene-poly-isoprene-block copolymers. The average molecular weights of the individual blocks are preferably in the ranges mentioned above. Such block copolymers can be formed by sequential processes or by coupling processes, such as those using procedures known to those skilled in the art.

It is preferable to selectively hydrogenate and then sulfonate in forming the present copolymers from the above types of starting material. The selective hydrogenation can be conducted in the presence of catalysts for attaching hydrogen atoms to the conjugated diene linkages without materially affecting the unsaturation of monovinyl arene polymer blocks. Particularly suitable catalysts are the products of reducing a metal of the group consisting of cobalt, nickle, manganese, molybdemum, or mixtures of them. Such a selective hydrogenation inactivates the conjugated diene polymer blocks and renders them relatively inert to a sulfonation reaction. Although other means of effecting such an inactivation can be used, the selective hydrogenation is preferred.

The selectively hydrogenated block copolymers are selectively sulfonated to attach sulfonate groups to the aromatic radicals. The sulfonation is preferably conducted with the copolymer dissolved or dispersed in an inert medium such as a haloalkene at a temperature from about −10° to 100°C. Dichloromethane or dichloropropane, or the like, are suitable solvents. Suitable sulfonating agents comprise the additional compounds of sulfurtrioxide with trialkyl phosphates such as a triethyl phosphate dissolved in 1,2-dichloroethane. The sulfonation is preferably carried to the extent of attaching at least about 0.8 to substantially 2.0 sulfonic acid groups per styrene unit.

The procedures described in the above-mentioned U.S. Pat. No. 3,577,357 are particularly suitable as long as they are modified to provide an arrangement of water-soluble and water-insoluble polymer blocks (such as a B-A-B sequence of blocks) of the molecular weights mentioned above, to provide a substantially completely water-soluble block copolymer that functions as a viscosifier in an aqueous liquid. Particularly suitable hydrogenation procedures are more completely described in the above-mentioned U.S. Pat. No. 3,595,942.

For uses where the chemical stability requirements are relatively low, e.g. where the reservoir temperature is less than 140°F, the block copolymers used in the present process can contain polymer chains with various types of linkages such as ether, amide, or the like, linkages. Such reservoirs may have relatively low temperatures and/or the oil displacing operations may require only relatively short residence times of the oil displacing liquid within the reservoir. In such situations, suitable block copolymers can contain a mixture of polyethyleneoxide water-soluble blocks and polyoxypropyleneoxide water-insoluble polymer blocks. Such block copolymers have been proposed as surface active agents or gel-forming materials in U.S. Pat. Nos. 3,203,955 and 3,639,574. Such co-polymers suitable for the present process can be made by the procedure described in those patents as long as the size and relative proportions of the water-soluble and water-insoluble polymer blocks are arranged to provide a water-soluble copolymer and to be substantially within the molecular weight ranges described above.

The temperature of a subterranean reservoir in which oil is to be displaced can be determined in numerous ways. For example, the reservoir temperature may be known from logs or other data from the well to be treated for comparable wells in the same or adjoining fields. The reservoir temperature can be determined by measuring the temperature of fluid in the well adjacent to the formation or fluid produced from the well, or the like.

The injectivity of the reservoir can similarly be determined by means of prior or currently conducted measurements in the well to be treated and/or such measurements in other wells that are representative. The term "reservoir injectivity" is used herein to refer to the injectivity in or around a well being treated by an injection or production of fluid through the well. Such an injectivity is affected by the permeability of perforations, gravel packs, etc. within the well.

As known to those skilled in the art, where the reservoir injectivity is relatively low, a relatively high degree of shear is inherently imparted to a liquid being injected at an economically feasible rate. The need for shear-stability in a water-thickening polymer is increased by need for a relatively rapid rate of injection, such as 30 barrels per day per foot, into a reservoir of a moderate injectivity, such as 100 milli-darcy, or a need for a moderate rate of injection, such as 6 barrels per day per foot, in a reservoir having a low injectivity, such as 25 milli-darcy.

In general, in displacing an oil with a subterranean reservoir formation by injecting a viscosity enhanced aqueous solution, the effective viscosity (or reciprocal of the mobility within the reservoir) should be at least substantially equal to and preferably greater than that of the reservoir oil and/or any oil displacing liquid (such as an aqueous or oil external surfactant system) that is injected ahead of the viscosity enhanced solution. In the present process, the concentration of the reservoir-tailored block copolymer should be in the order of from about 10 to 10,000 parts by weight of copolymer per million parts by weight of solution. Such a concentration provides viscosities in the order of from about 2 to 50 centipoises at room temperature in water which may contain various amounts of dissolved salts. Such viscosities are usually sufficient to provide effective displacements of a reservoir oil.

In general, the oil displacing liquids of the present invention can advantageously be used in oil displacing operations and/or oil recovery operations in conjunction with substantially any of the conventionally used water-flooding additives and/or supplemental materials, such as: surface active systems or components; sacrificially absorbed solutes, such as carbonates, polyphosphates, or the like; pH adjusting materials, etc. The liquids of the present invention are particularly useful in a chemical flood oil recovery process in which a slug of surfactant system is injected ahead of (or its surfactant components are dissolved in) a portion of the present oil displacing liquid. As used herein, the term "oil displacing liquid" or "the displacing of oil" within a reservoir refers to such an operation where the oil being displaced is contacted by either the oil displacing liquid or a surfactant that contains or precedes such a liquid.

What is claimed is:
1. In a process for displacing fluid in a subterranean reservoir by injecting a thickened aqueous solution into the reservoir, the improvement which comprises:
   forming the solution by dissolving a substantially water-soluble linear block copolymer in an aqueous liquid in a concentration, of from about 10–10,000 parts of polymer per million parts of liquid, that yields a selected solution viscosity at the reservoir temperature;
   using as the dissolved block copolymer one which contains relatively water-soluble polymer blocks (A) and relatively water-insoluble polymer blocks (B) in a B-A-B sequence with the average molecular weight of the water-soluble blocks of the block copolymer being from about 100,000 to 2,000,000 and the average molecular weight of the water-insoluble blocks of the block copolymer being from about 1,000 to 10,000 and with the compositions and proportions of the polymer blocks being such that the molecules of the block copolymer have a selected degree of shear and chemical stability at the reservoir temperature;
   said relatively water-soluble polymer blocks being sulfonated polyvinylarene blocks and said rela- tively water insoluble polymer blocks being alpha-olefin elastomeric polymer blocks; and injecting the solution into the reservoir at a rate at which the solution viscosity is substantially undiminished due to a shear-degradation of the molecules of the block copolymer.

2. The process of claim 1 in which the relatively water-soluble polymer blocks are blocks of sulfonated polystyrene or polyalpha-methyl styrene and the relatively water-insoluble blocks are blocks of selectively hydrogenated polymers of butadiene or isoprene.

* * * * *